(12) United States Patent
Fan et al.

(10) Patent No.: US 12,273,225 B2
(45) Date of Patent: Apr. 8, 2025

(54) FREQUENCY DIFFERENCE FOR AMBIENT DEVICE DECODING

(71) Applicant: QUALCOMM Incorporated, San Diego, CA (US)

(72) Inventors: Zhifei Fan, San Diego, CA (US); Jing Sun, San Diego, CA (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 18/317,840

(22) Filed: May 15, 2023

(65) Prior Publication Data
US 2024/0388489 A1  Nov. 21, 2024

(51) Int. Cl.
*H04L 27/26* (2006.01)
(52) U.S. Cl.
CPC ................................ *H04L 27/2626* (2013.01)

(58) Field of Classification Search
CPC ............ H04L 27/2626; H04L 27/2647; H04L 27/2649; H04L 27/2697; H04L 27/2602; H04L 27/261; H04L 27/2613
See application file for complete search history.

(56) References Cited

U.S. PATENT DOCUMENTS

2019/0327296 A1\* 10/2019 Hayashi ................. H04L 51/04
2024/0036185 A1\*  2/2024 Ji ........................ H04W 64/003
2024/0389080 A1\* 11/2024 Fan .................... H04W 72/0446

\* cited by examiner

*Primary Examiner* — Khanh C Tran
(74) *Attorney, Agent, or Firm* — Guang Y. Zhang; Harrity & Harrity, LLP

(57) ABSTRACT

Various aspects of the present disclosure generally relate to wireless communication. In some aspects, a reader device may transmit a delta message that indicates a frequency difference between a data tone frequency for the reader device and a helper tone frequency. The reader device may transmit a data tone signal at the data tone frequency and a helper tone signal at the helper tone frequency. The helper tone signal may be a waveform that is shared among multiple reader devices. Numerous other aspects are described.

22 Claims, 13 Drawing Sheets

FREQUENCY DIFFERENCE FOR AMBIENT DEVICE DECODING

FIELD OF THE DISCLOSURE

Aspects of the present disclosure generally relate to wireless communication and to techniques and apparatuses for using a frequency difference for ambient device decoding.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a reader device. The method may include transmitting a delta message that indicates a frequency difference (delta) between a data tone frequency for the reader device and a helper tone frequency. The method may include transmitting a data tone signal at the data tone frequency and a helper tone signal at the helper tone frequency, where the helper tone signal is a waveform shared among multiple reader devices.

Some aspects described herein relate to a method of wireless communication performed by an ambient device. The method may include receiving a first delta message that indicates a first frequency difference between a first data tone frequency and a helper tone frequency. The method may include receiving, from a first reader device, a first data tone signal at the first data tone frequency and a helper tone signal at the helper tone frequency, where the helper tone signal is a waveform that is shared among multiple reader devices.

Some aspects described herein relate to a reader device for wireless communication. The reader device may include one or more memories and one or more processors coupled to the one or more memories. The one or more processors may be configured to transmit a delta message that indicates a frequency difference between a data tone frequency for the reader device and a helper tone frequency. The one or more processors may be configured to transmit a data tone signal at the data tone frequency and a helper tone signal at the helper tone frequency, where the helper tone signal is a waveform shared among multiple reader devices.

Some aspects described herein relate to an ambient device for wireless communication. The ambient device may include one or more memories and one or more processors coupled to the one or more memories. The one or more processors may be configured to receive a first delta message that indicates a first frequency difference between a first data tone frequency and a helper tone frequency. The one or more processors may be configured to receive, from a first reader device, a first data tone signal at the first data tone frequency and a helper tone signal at the helper tone frequency, wherein the helper tone signal is a waveform that is shared among multiple reader devices.

Some aspects described herein relate to a non-transitory computer-readable medium that stores a set of instructions for wireless communication by a reader device. The set of instructions, when executed by one or more processors of the reader device, may cause the reader device to transmit a delta message that indicates a frequency difference between a data tone frequency for the reader device and a helper tone frequency. The set of instructions, when executed by one or more processors of the reader device, may cause the reader device to transmit a data tone signal at the data tone frequency and a helper tone signal at the helper tone frequency, where the helper tone signal is a waveform shared among multiple reader devices.

Some aspects described herein relate to a non-transitory computer-readable medium that stores a set of instructions for wireless communication by an ambient device. The set of instructions, when executed by one or more processors of the ambient device, may cause ambient device to receive a first delta message that indicates a first frequency difference between a first data tone frequency and a helper tone frequency. The set of instructions, when executed by one or more processors of the ambient device, may cause the ambient device to receive, from a first reader device, a first data tone signal at the first data tone frequency and a helper tone signal at the helper tone frequency, where the helper tone signal is a waveform that is shared among multiple reader devices.

Some aspects described herein relate to an apparatus for wireless communication. The apparatus may include means for transmitting a delta message that indicates a frequency difference between a data tone frequency for the apparatus and a helper tone frequency. The apparatus may include means for transmitting a data tone signal at the data tone frequency and a helper tone signal at the helper tone frequency, where the helper tone signal is a waveform shared among multiple apparatuses.

Some aspects described herein relate to an apparatus for wireless communication. The apparatus may include means for receiving a first delta message that indicates a first frequency difference between a first data tone frequency and a helper tone frequency. The apparatus may include means for receiving, from a first reader device, a first data tone signal at the first data tone frequency and a helper tone signal at the helper tone frequency, where the helper tone signal is a waveform that is shared among multiple reader devices.

Aspects generally include a method, apparatus, system, computer program product, non-transitory computer-readable medium, user equipment, base station, reader device, ambient device, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
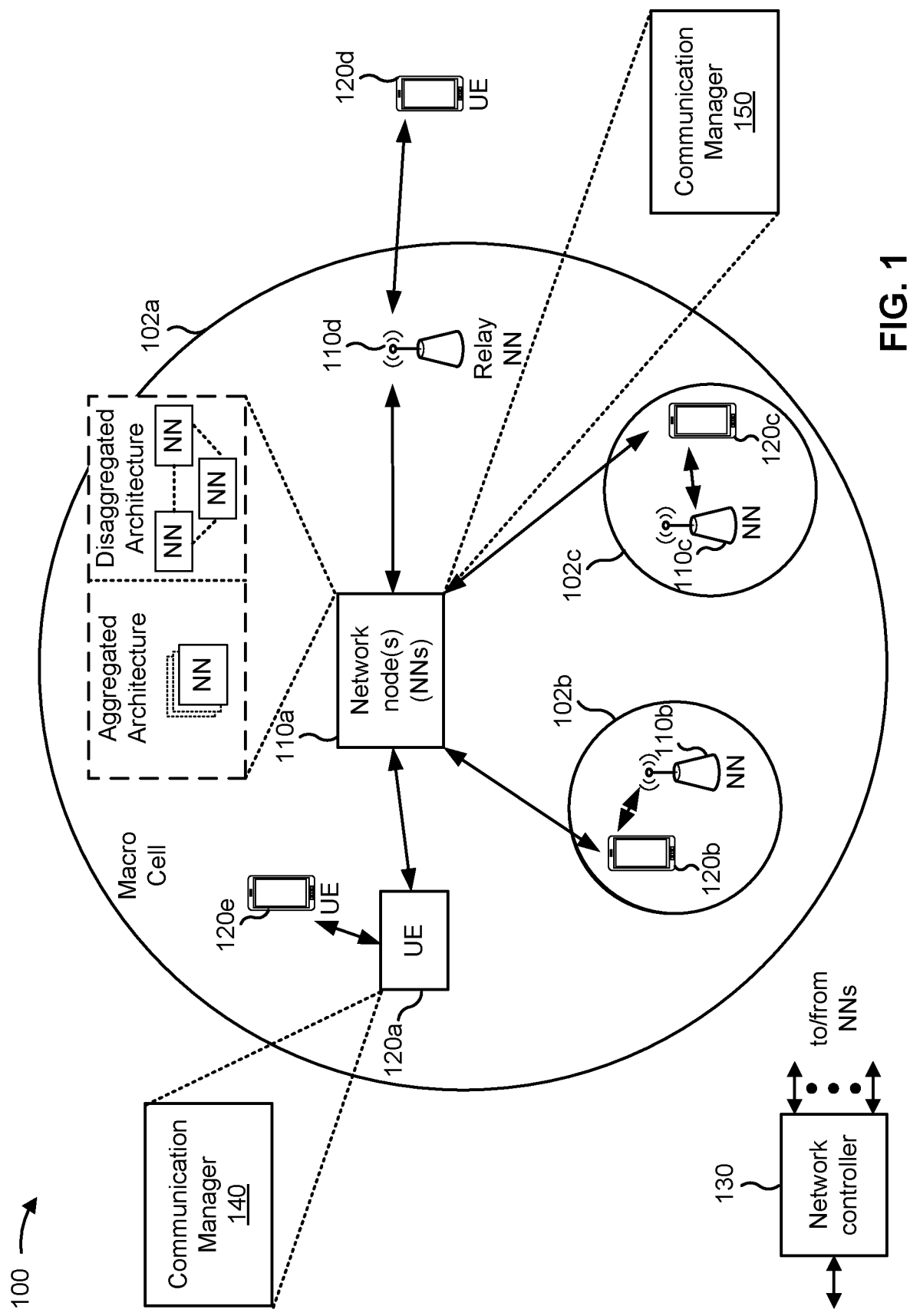
FIG. 1 is a diagram illustrating an example of a wireless network, in accordance with the present disclosure.

An ambient Internet-of-Things (IoT) device may have less processing capability for decoding signals and may lack battery power or some radio frequency (RF) components, such as a local oscillator. The ambient device may use envelope tracking to detect an amplitude shift keying (ASK) or a phase shift keying (PSK) modulated signal transmitted by a reader that transmits signals to and receives signals from ambient IoT devices. An envelope detector of the ambient device may generate an envelope component that corresponds to the received signal. The ambient device may decode the signal using the envelope component.

However, envelope tracking can suffer from interference from a neighboring reader (e.g., gNB) transmission. The neighboring reader transmission may have a similar envelope as the serving reader (e.g., gNB) transmission. To avoid the interference from other readers, a reader may use a dual-tone-based data transmission, where readers transmit the data waveform at two frequencies, and the difference between the frequencies is used to recover the data at the ambient device. The reader may use a helper-tone-based data transmission, where readers transmit the data waveform at a data tone frequency and transmit the shared waveform (e.g., a pure sine wave) at a helper tone frequency. The difference between these two frequencies is used to recover the data at the ambient IoT device. However, if each reader transmits its own data tone and its own helper tone, this can consume a larger amount of signaling resources (e.g., frequency bandwidth) when multiple readers are involved.

According to various aspects described herein, each reader may transmit downlink data using two frequency tones, including a data tone signal at a data tone frequency to carry the data and a helper tone signal at a helper tone frequency with a shared waveform. The shared waveform may be a fixed waveform, such as a sine signal. The sine signal may be a pure sine signal that is a simple mathematical sine wave without any modulation for data. The helper tone frequency may be shared by all of the readers. That is, all of the readers may use the same frequency tone as the helper tone. The reader may indicate a frequency difference (delta) between its data tone frequency and the helper tone frequency. The ambient device may use this frequency difference to detect the data tone frequency of the reader, with respect to the higher-powered helper tone frequency. By having readers share the helper tone frequency, the readers may use less signaling resources than if each reader used a different helper tone frequency.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a reader device (e.g., a network node 110, a UE 120) may include a communication manager 140 or 150. As described in more detail elsewhere herein, the communication manager 140 or 150 may transmit a delta message that indicates a frequency difference between a data tone frequency for the reader device and a helper tone frequency. The communication manager 140 or 150 may transmit a data tone signal at the data tone frequency and a helper tone signal at the helper tone frequency, where the helper tone signal is a waveform shared among multiple reader devices. Additionally, or alternatively, the communication manager 140 or 150 may perform one or more other operations described herein.

In some aspects, an ambient device (e.g., a UE 120 or a reduced capability version of a UE 120) may include a communication manager 140. As described in more detail elsewhere herein, the communication manager 140 may receive a first delta message that indicates a first frequency difference between a first data tone frequency and a helper tone frequency. The communication manager 140 may receive, from a first reader device, a first data tone signal at the first data tone frequency and a helper tone signal at the helper tone frequency, where the helper tone signal is a waveform that is shared among multiple reader devices. Additionally, or alternatively, the communication manager 140 may perform one or more other operations described herein.

As indicated above, FIG. 1 is provided as an example. Other examples may differ from what is described with regard to FIG. 1.

Figure 2:
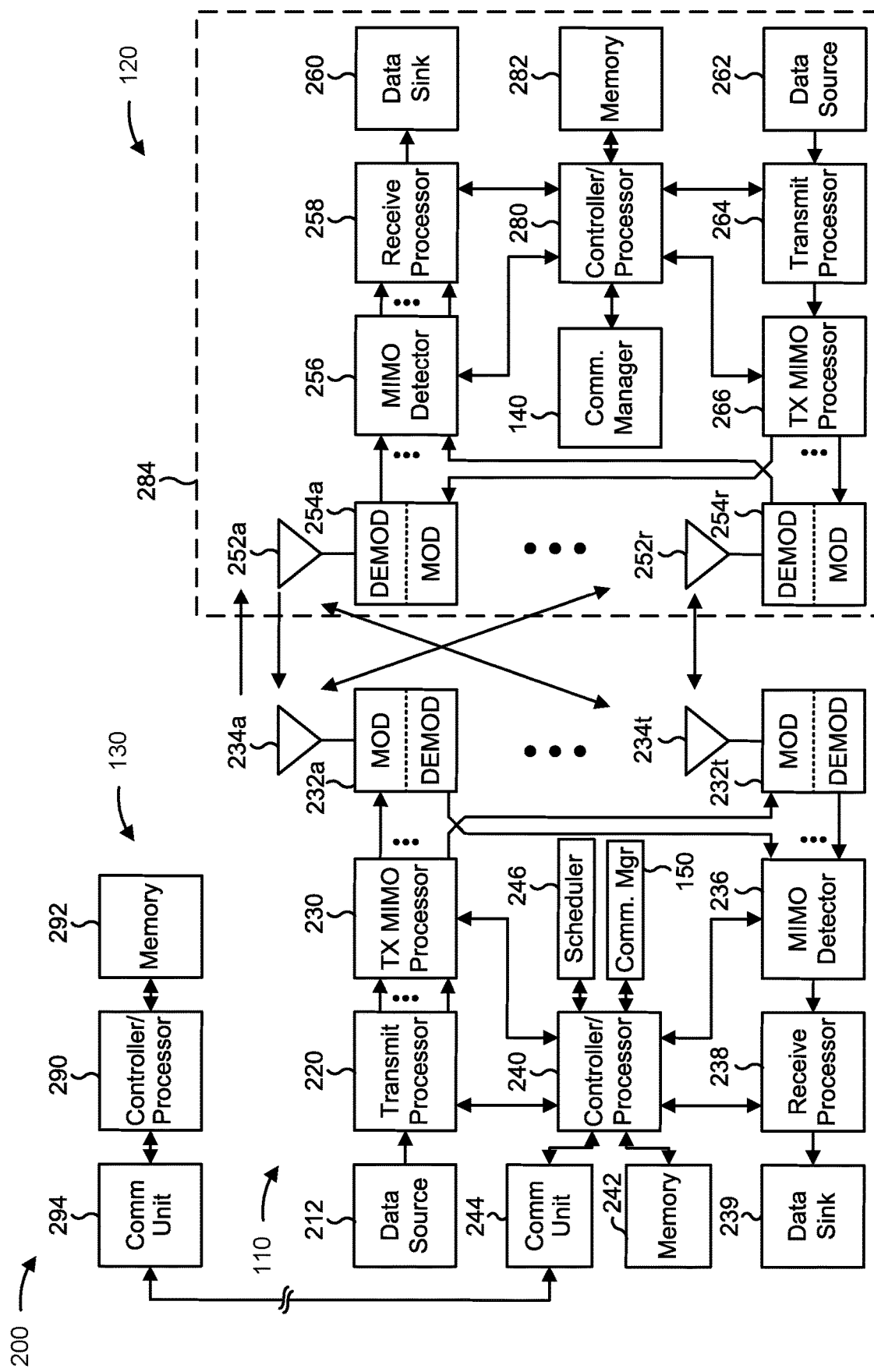
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

A controller/processor of a network entity (e.g., controller/processor 240 of the network node 110), the controller/processor 280 of the UE 120, and/or any other component(s) of FIG. 2 may perform one or more techniques associated with using a frequency difference for ambient device decoding, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a reader device (e.g., a network node 110, a UE 120) includes means for transmitting a delta message that indicates a frequency difference between a data tone frequency for the reader device and a helper tone frequency; and/or means for transmitting a data tone signal at the data tone frequency and a helper tone signal at the helper tone frequency, wherein the helper tone signal is a waveform shared among multiple reader devices. In some aspects, the means for the reader device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the reader device to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an ambient device (e.g., a UE 120 or a UE 120 with reduced capability, an ambient IoT device) includes means for receiving a first delta message that indicates a first frequency difference between a first data tone frequency and a helper tone frequency; and/or means for receiving, from a first reader device, a first data tone signal at the first data tone frequency and a helper tone signal at the helper tone frequency, wherein the helper tone signal is a waveform that is shared among multiple reader devices. In some aspects, the means for the ambient device to perform operations described herein may include, for example, one or more of communication manager 140, antenna 252, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 220, the receive processor 238, and/or the TX MIMO processor 230 may be performed by or under the control of the controller/processor 240.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
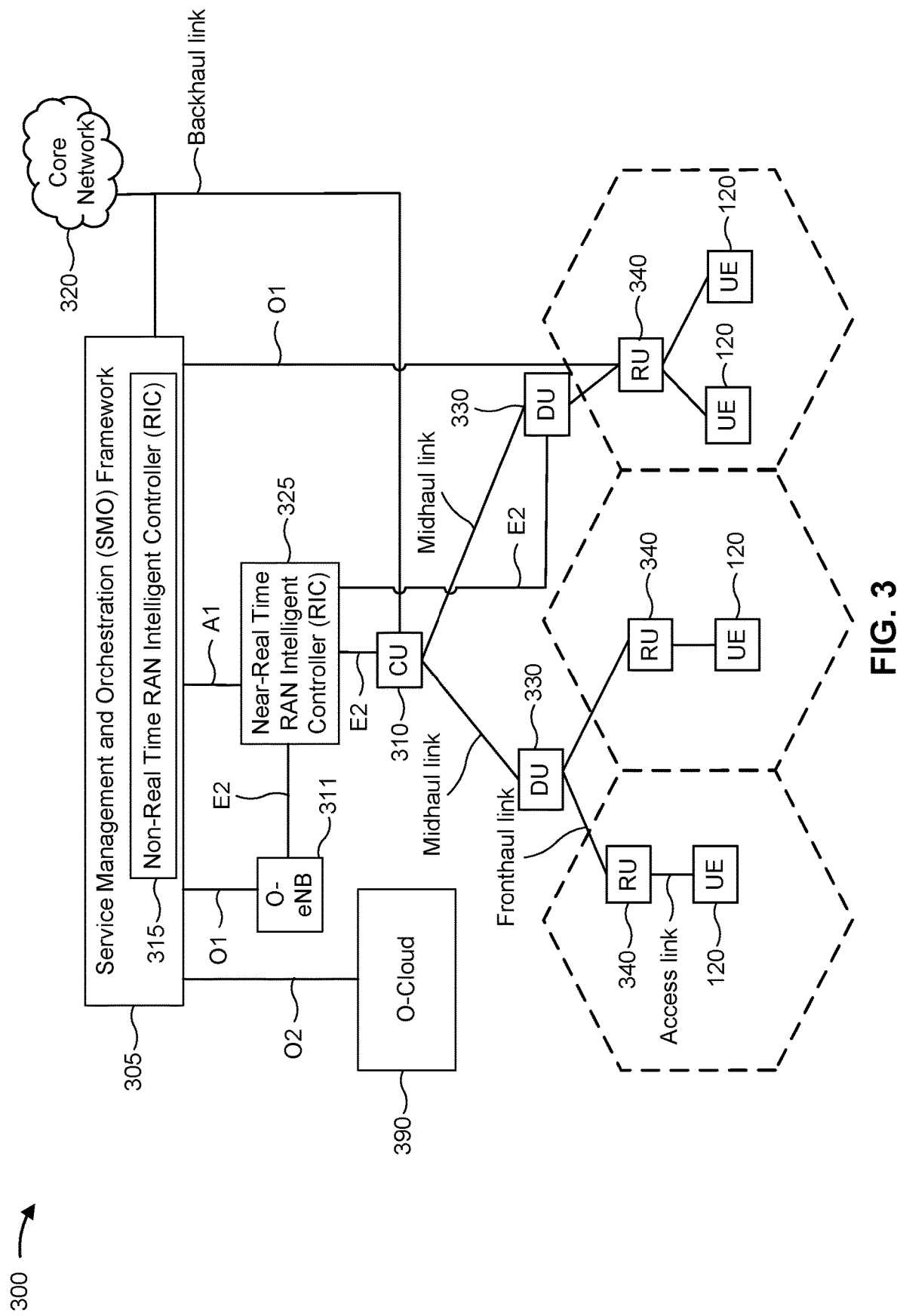
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUS 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
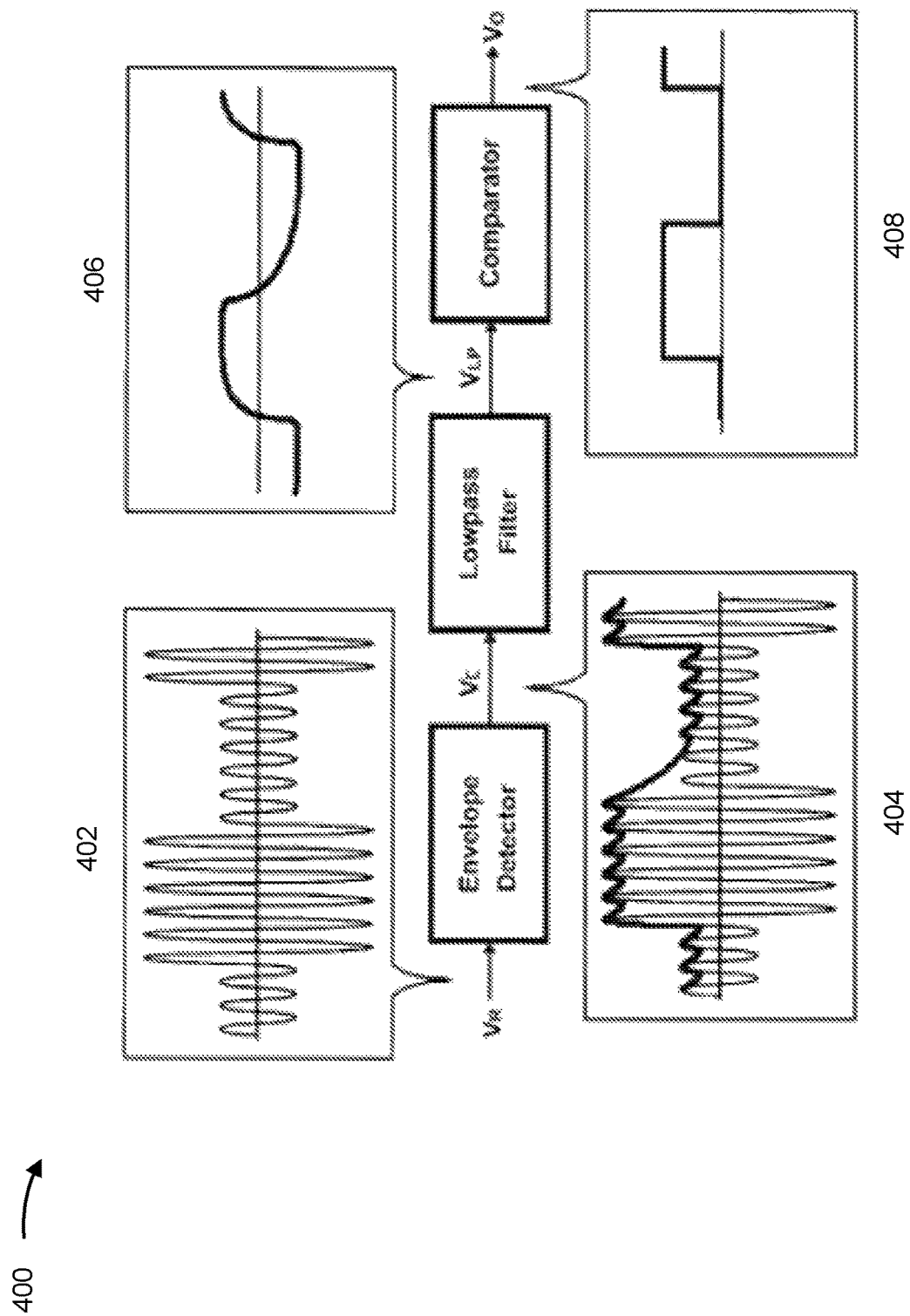
FIG. 4 is a diagram illustrating an example of envelope tracking, in accordance with the present disclosure.

FIG. 4 is a diagram illustrating an example 400 of envelope tracking, in accordance with the present disclosure.

Wireless devices may be of different categories and support different capabilities. For example, a first category of UEs may have a less advanced capability (e.g., a lower capability and/or a reduced capability) and a second category of UEs that have a more advanced capability (e.g., a higher capability). A UE of the first category may have a reduced feature set compared to UEs of the second category. A UE of the first category may be, for example, an ambient IoT device. An ambient IoT device may be a tag, a radio frequency identifier (RFID) device, or another wireless device that has little or no battery power. A UE of the second category may have an advanced feature set compared to UEs of the second category, and may be referred to as a baseline UE, a high tier UE, an NR UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TTI.

An ambient IoT device may have less processing capability for decoding signals and may lack a local oscillator. The ambient device may use envelope tracking to detect an ASK or PSK modulated signal. Envelope tracking may be used by a low-tier device without active RF components. This may involve downlink reception without down-conversion. No carrier frequency offset or frequency synchronization is needed.

Example 400 shows envelope tracking. As shown by reference number 402, an ambient IoT device may receive a signal. As shown by reference number 404, an envelope detector may generate an envelope component that corresponds to the received signal, shown by the bold line. The low pass filter may remove portions of the received signal to leave a smoothed envelope component that is similar to the original envelope component, as shown by reference number 406. A comparator may generate a waveform component that corresponds to the smoothed envelope component, as shown by reference number 408.

Envelope tracking can suffer from interference from a neighboring reader (e.g., gNB) transmission. The neighboring reader transmission may have a similar envelope as the serving reader (e.g., gNB) transmission (even in the case of frequency division duplexing (FDD) transmission). To avoid the interference from other readers, a reader may use a dual-tone-based data transmission, where readers transmit the data waveform at two frequencies, and the difference between the frequencies is used to recover the data at the ambient IoT device. The readers may use a helper-tone-based data transmission, where readers transmit the data waveform at a data tone frequency and transmit the waveform (e.g., a pure sine wave) at a helper tone frequency. The difference between these two frequencies is used to recover the data at the ambient IoT device. In some aspects, each reader may use two frequencies to transmit the downlink signal, and the two frequencies from different readers are not overlapping. However, if each reader transmits its own data tone and its own helper tone, this can consume a larger amount of signaling resources (e.g., frequency bandwidth) when multiple readers are involved.

As indicated above, FIG. 4 is provided as an example. Other examples may differ from what is described with regard to FIG. 4.

Figure 5:
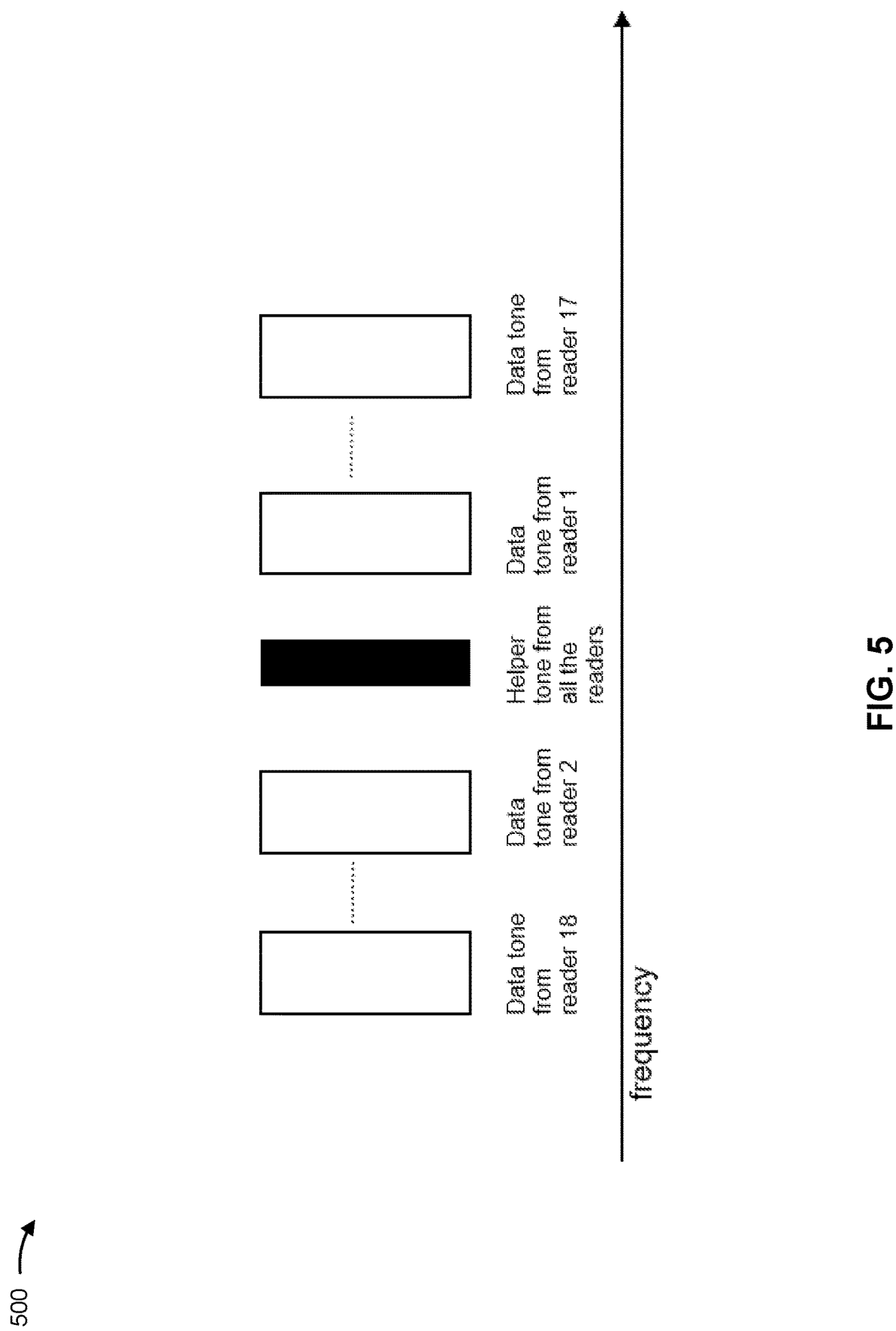
FIG. 5 is a diagram illustrating an example of using a shared helper tone frequency, in accordance with the present disclosure.

FIG. 5 is a diagram illustrating an example 500 of using a shared helper tone frequency, in accordance with the present disclosure.

According to various aspects described herein, each reader may transmit downlink data using two frequency tones, including a data tone signal at a data tone frequency to carry the data and a helper tone signal at a helper tone frequency with a shared waveform. The shared waveform may be a fixed waveform, such as a sine signal. The sine signal may be a pure sine signal that is a simple mathematical sine wave without any modulation for data. The helper tone frequency may be shared by all of the readers. That is, all of the readers may use the same frequency tone as the helper tone. The reader may indicate a frequency difference (delta) between its data tone frequency and the helper tone frequency. The ambient device may use this frequency difference to detect the data tone frequency of the reader, with respect to the higher-powered helper tone frequency. By sharing the helper tone frequency, the readers may use less signaling resources than if each reader used a different helper tone frequency.

Example 500 shows different data tone frequencies (white boxes) for different readers, such as reader 18, reader 2, reader 1, and reader 17. The readers may be neighboring readers, or close enough to detect another reader's signal according to a specified signal strength threshold. Neighboring readers may be identified and grouped by the network or a controlling reader. All of the readers may share the same helper tone frequency, shown by the dark box.

As indicated above, FIG. 5 is provided as an example. Other examples may differ from what is described with regard to FIG. 5.

Figure 6:
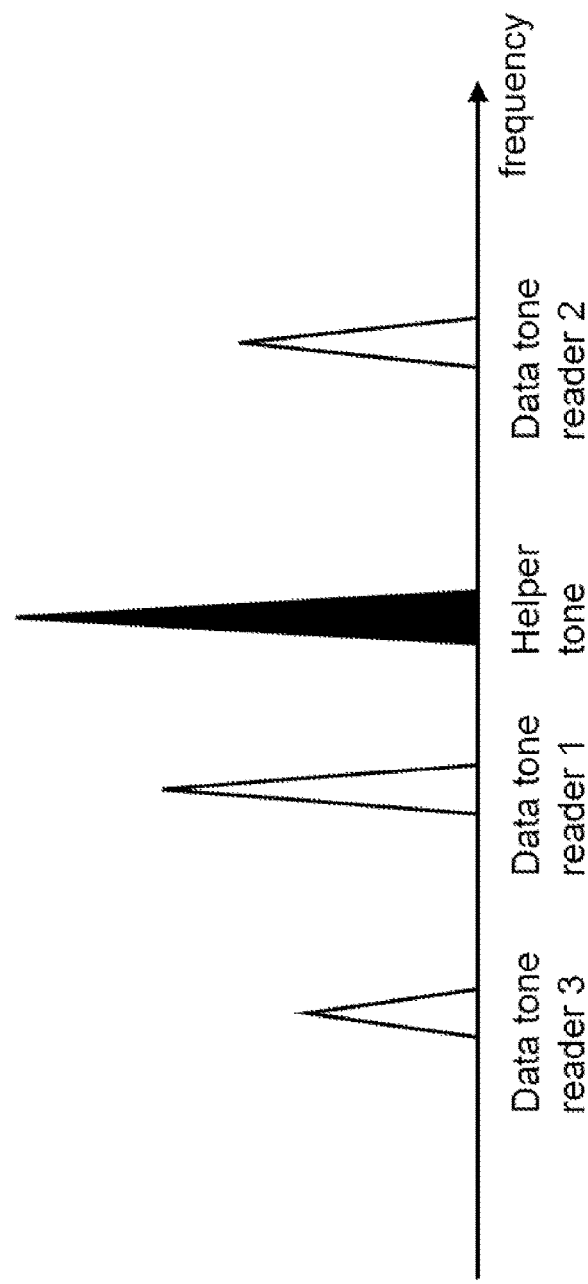
FIG. 6 is a diagram illustrating an example of data tones and a helper tone, in accordance with the present disclosure.

FIG. 6 is a diagram illustrating an example 600 of data tones and a helper tone, in accordance with the present disclosure.

Example 600 shows an example signal received by an ambient IoT device, such as a tag, from three readers. Each reader i may transmit a data tone signal represented by $\sqrt{P_i}(a_i(t) \sin (2\pi f_i t) + \sin (2\pi f_h t))$, where $a_i(t)$ is the signal (with respect to time t) sent by reader i, $f_i$ is the data tone signal used by reader i, $f_h$ is a helper tone, and $P_i$ is the power. The received signal may be represented as a sum of the signals from all of the readers, such as $\Sigma_i(\sqrt{P_i}(h_i(t)a_i(t) \sin (2\pi f_i t) + h_i(t) \sin (2\pi f_h t))) = \Sigma_i(\sqrt{P_i}(h_i(t)a_i(t) \sin (2\pi f_i t)) + (\Sigma_i(\sqrt{P_i}h_i(t)))) \sin (2\pi f_h t)$, where $h_i(t)$ is the channel response from reader i to the tag. Example 600 shows the helper tone signal that is the combined helper tone signal from all three readers, represented as $(\Sigma_i(\sqrt{P_i}h_i(t))) \sin (2\pi f_h t)$. If there are many readers, having the same helper tone frequency saves the bandwidth and boosts the power of the helper tone signal. By using a shared helper tone frequency, the readers may improve the detection probability of the tags.

As indicated above, FIG. 6 is provided as an example. Other examples may differ from what is described with regard to FIG. 6.

Figure 7:
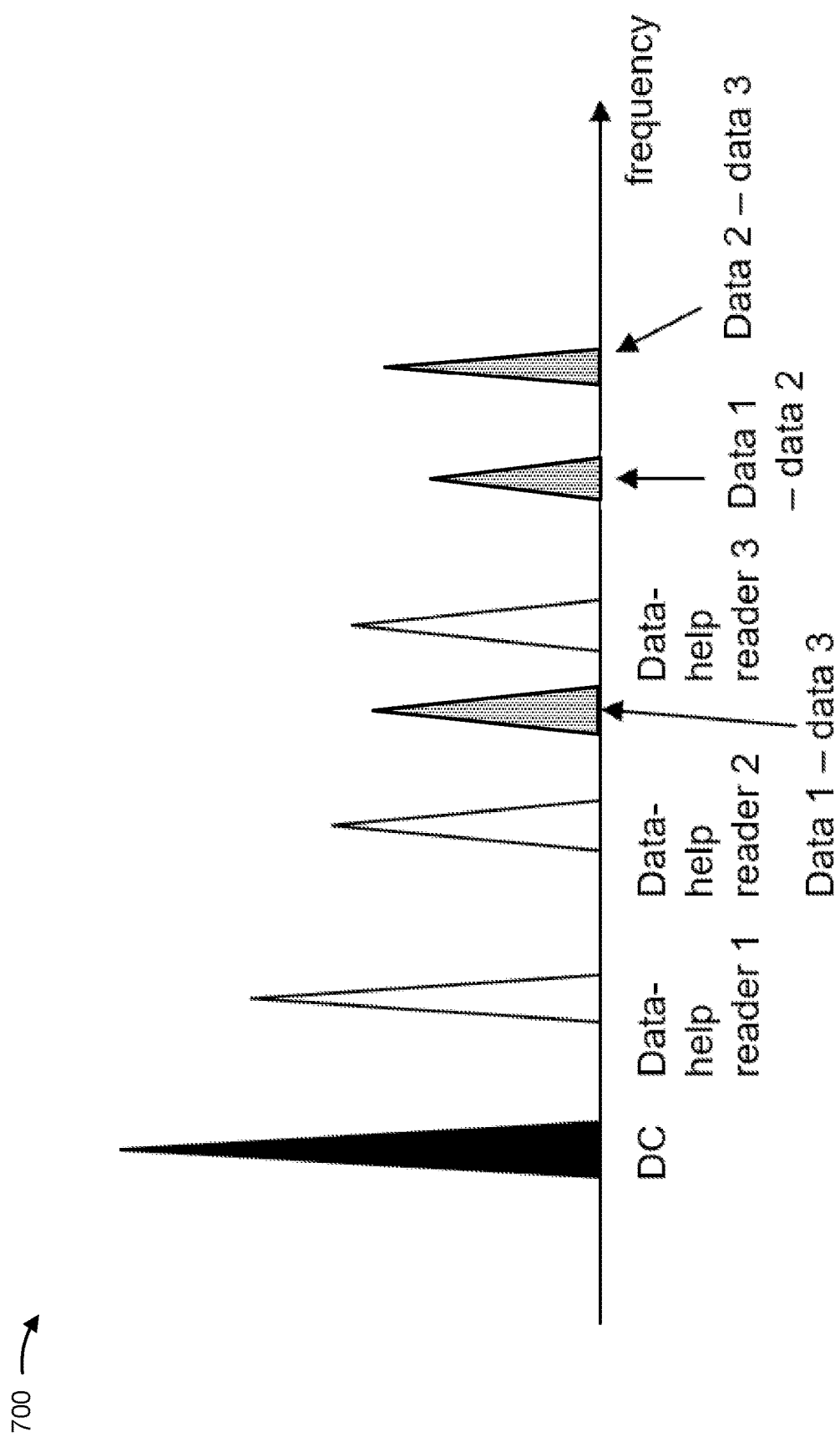
FIG. 7 is a diagram illustrating an example of envelope detection, in accordance with the present disclosure.

FIG. 7 is a diagram illustrating an example 700 of envelope detection, in accordance with the present disclosure.

Example 700 shows signal components at the tag after envelope detection. The signal may include data tones for different readers (white tones in example 700), a direct current (DC) portion as the helper tone (dark tone), and differences between the data tones (shaded tones). The signal components may include $\Sigma_i(P_i(|h_i(t)a_i(t)|^2 + |h_i(t)|^2) + 2\Sigma_i(\sqrt{P_i}h_i(t)a_i(t)(\Sigma_j\sqrt{P_j}h_j(t)) \cos (2\pi(f_i - f_h)t)) + \Sigma_i\Sigma_j(\sqrt{P_i}\sqrt{P_j}h_i(t)h_j(t)a_i(t)a_j(t) \cos (2\pi(f_i - f_j)t))$. The first summation $\Sigma_i(P_i(|h_i(t)a_i(t)|^2 + |h_i(t)|^2))$ is the DC portion. Since the DC portion is the helper tone that includes energy from all of the signals, the DC portion has a strong peak.

The second summation $2\Sigma_i((\sqrt{P_i}h_i(t)a_i(t))(\Sigma_j\sqrt{P_j}h_j(t)) \cos (2\pi(f_i - f_h)t))$ is a signal component that represents the frequency difference $(f_i - f_h)$ between the data tone signal of each reader and the helper tone signal. The tag may use this component for the detection. If the tag wants to detect the reader i's signal, the tag may use $2(\sqrt{P_i}h_i(t)a_i(t))(\Sigma_j\sqrt{P_j}h_j(t)) \cos (2\pi(f_i - f_h)t)$ to perform the detection. In example 700, if reader 1's signal is the desired data tone, that corresponding signal will be used to perform the detection.

The third summation $\Sigma_i \Sigma_j (\sqrt{P_i}\sqrt{P_j} h_i(t) h_j(t) a_i(t) a_j(t) \cos(2\pi (f_i-f_j)t))$ is the difference between data tones of different readers. These are shown as the shaded signals in example 700. These difference tones are all interferences with respect to the desired signal. From the above equations and example 700, to avoid interference, frequency differences may be selected such that $f_i \neq f_j$, $\forall i, j$ and $(f_i-f_j) \neq (f_k-f_h)$, $\forall i, j, k$, where i and k indicate data tone frequencies for different readers and j and h represent helper tone frequencies for the different readers. In other words, the frequency difference between a data tone frequency for one reader and the helper tone frequency is expected to be different than a frequency difference between a data tone frequency of a neighboring reader and the helper tone frequency. The largest frequency difference $f_i-f_h$ is limited by the bandwidth that the tag can handle. In some aspects, the network or the reader may also select the data tone frequency such that a frequency difference between the data tone frequency for the reader and a data tone frequency for a neighboring reader does not overlap with the frequency difference between the data tone frequency for the reader and the helper tone frequency and a frequency difference between the data tone frequency for the neighboring reader and the helper tone frequency.

As indicated above, FIG. 7 is provided as an example. Other examples may differ from what is described with regard to FIG. 7.

Figure 8:
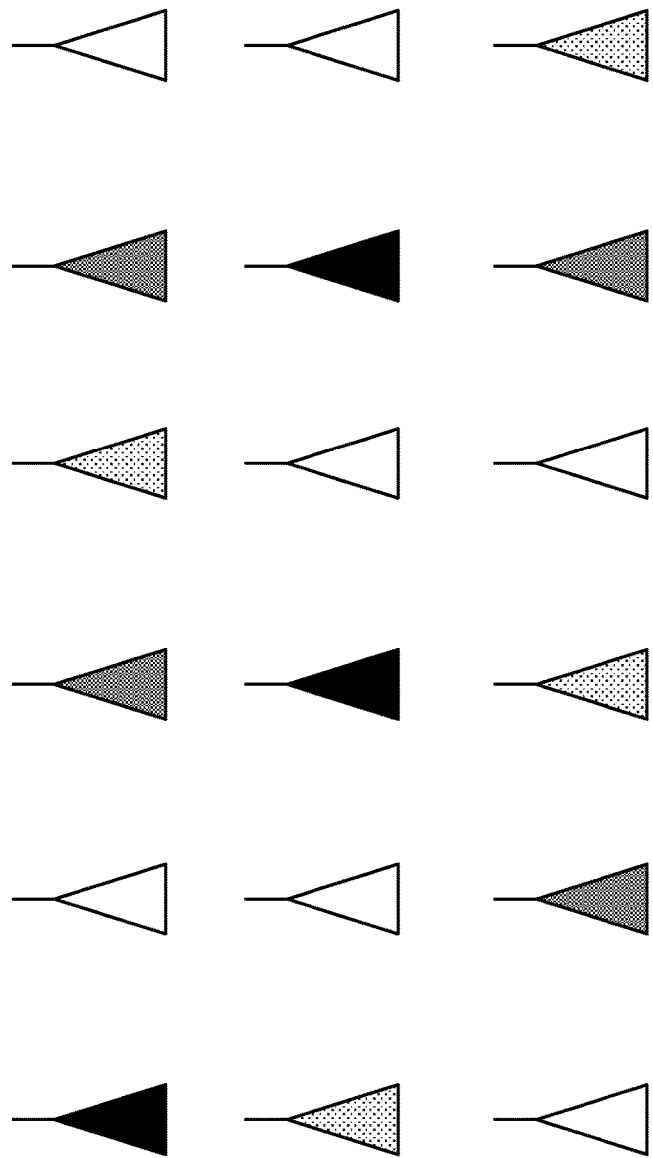
FIG. 8 is a diagram illustrating an example of reader locations, in accordance with the present disclosure.

FIG. 8 is a diagram illustrating an example 800 of reader locations, in accordance with the present disclosure.

If there are many readers around, the network may carefully select $f_i$ for each reader to avoid interference between readers. For readers adjacent or close to one another, the data tone frequency locations may be selected to be far apart. For readers far away from each other, the data tone frequency locations may be closer.

Example 800 shows frequency selection for 18 readers. The readers with different shading may be expected to have different data tones. The readers with the same shading may be expected to have the same or close data tones. The network may select data tone frequencies to avoid interference. In some aspects, readers may coordinate to select data tone frequencies to avoid interference.

In some aspects, readers may indicate to tags (ambient devices) that the tags are to use the transmission mode where two tones (data tone and helper tone) are to be used. A reader may indicate a frequency distance (delta) between the two tones $\Delta f_i = f_i - f_h$. The reader may also indicate a physical distance between readers. The network or a reader may transmit this information in a system message, such as a physical broadcast message, a system information block (SIB), a master information block (MIB), or in a unicast message. By selecting frequency differences and/or reader distances to avoid interference, the network and/or the readers may further improve the detection probability of the tags. Improving the detection probability conserves signaling resources that are otherwise wasted by transmitting signals that are not detected and decoded.

As indicated above, FIG. 8 is provided as an example. Other examples may differ from what is described with regard to FIG. 8.

Figure 9:
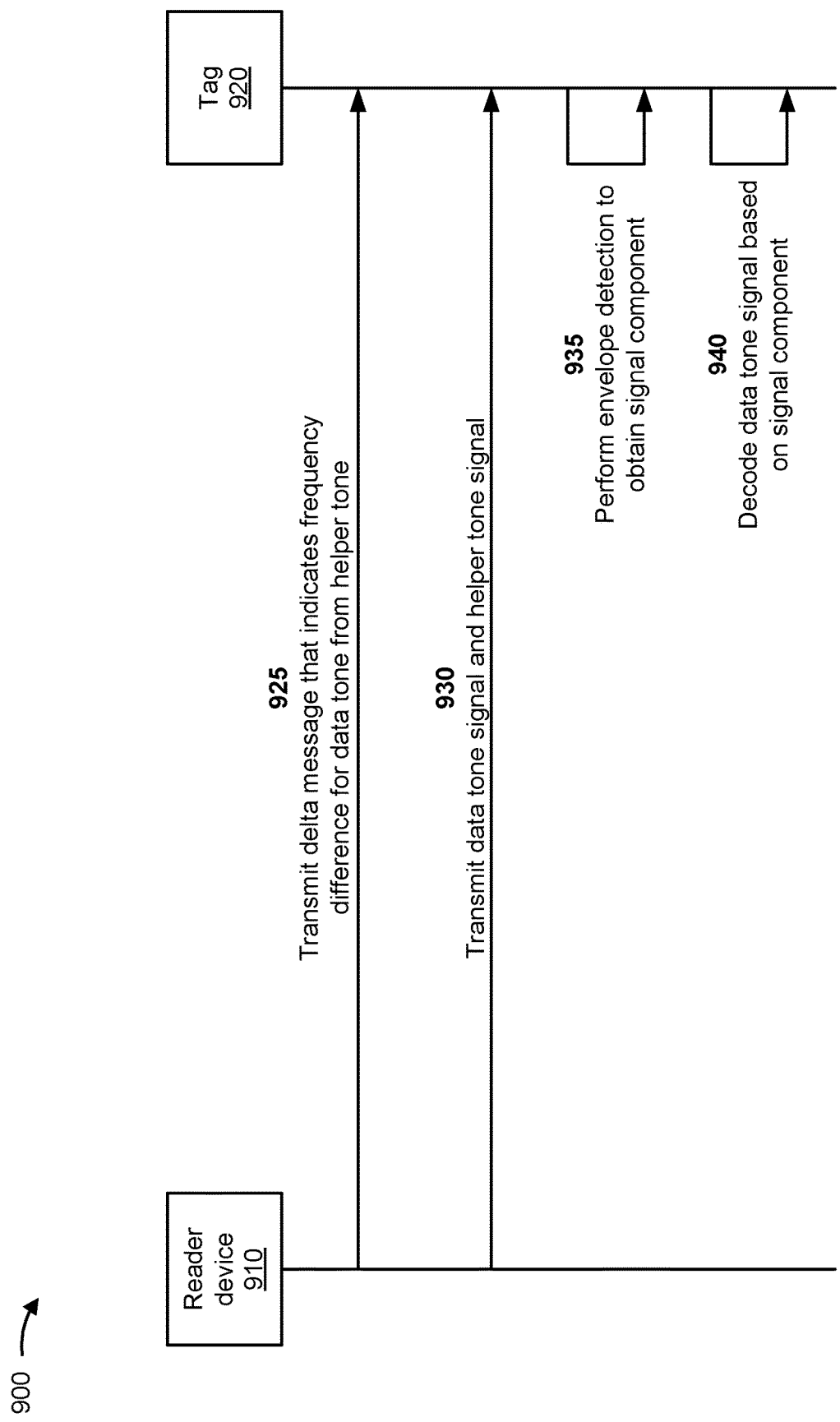
FIG. 9 is a diagram illustrating an example associated with indicating a frequency difference for envelope detection, in accordance with the present disclosure.

FIG. 9 is a diagram illustrating an example 900 associated with indicating a frequency difference for envelope detection, in accordance with the present disclosure. As shown in FIG. 9, a reader device 910 (e.g., network node 110, UE 120) and an RFID tag 920 (e.g., UE 120 operating as an ambient IoT device) may communicate with one another.

In some aspects, a reader may indicate, to an ambient IoT device (e.g., a tag), a frequency difference between a data tone frequency specific to the reader and a helper tone frequency. The tag may detect and decode a data tone frequency by identifying a helper tone signal and locating the data tone signal at a data tone frequency that is the frequency difference from the helper tone.

Example 900 shows an example of indicating the frequency difference to the tag. As shown by reference number 925, the reader device 910 may transmit a delta message that indicates a frequency difference between a data tone frequency for the reader device 910 and a helper tone frequency. As shown by reference number 930, the reader device 910 may transmit a data tone signal at the data tone frequency and a helper tone signal at the helper tone frequency, where the helper tone signal is a waveform shared among multiple reader devices. In some aspects, the reader device 910 may have transmitted an indication of a transmission mode in which the tag 920 uses the data tone frequency and the helper tone frequency.

The tag 920 may receive the data tone signal and the helper tone signal. As shown by reference number 935, the tag 920 may perform envelope detection on the data tone signal and the helper tone signal to obtain a signal component associated with the frequency difference. This may include the second summation described in connection with FIG. 7. As shown by reference number 940, the tag 920 may decode the data tone signal based at least in part on the signal component. The tag 920 may use the frequency difference captured in the signal component to locate a data tone frequency with respect to the helper tone frequency. The tag 920 may identify the helper tone frequency based at least in part on the stronger peak of the helper tone signal or based at least in part on information received about the helper tone frequency.

In some aspects, the reader device 910 may select the data tone frequency such that the frequency difference does not overlap with a frequency difference between the helper tone frequency and a data tone frequency for a neighboring reader device. In some aspects, the reader device 910 may receive an indication of the data tone frequency for the neighboring reader device. In some aspects, the reader device 910 may select the data tone frequency based at least in part on a distance between the reader device and the neighboring reader device. The reader device 910 may receive the indication of the data tone frequency for the neighboring reader device and/or a distance indication from the network, a controlling network entity, or another reader device.

In some aspects, to illustrate that multiple readers share the same helper tone frequency, the tag 920 may receive a second delta message that indicates a second frequency difference between a second data tone frequency for a second reader device and the helper tone frequency. The tag 920 may receive, from the second reader device, a second data tone signal at the second data tone frequency and the helper tone frequency at the helper tone frequency. The tag 920 may perform a second envelope detection on the second data tone signal and the helper tone signal. The second envelope detection may generate a second component associated with the second frequency difference. The tag 920 may decode the second data tone signal based at least in part on the second component. By having multiple readers share the same helper tone frequency, signaling resources are conserved.

As indicated above, FIG. 9 is provided as an example. Other examples may differ from what is described with respect to FIG. 9.

Figure 10:
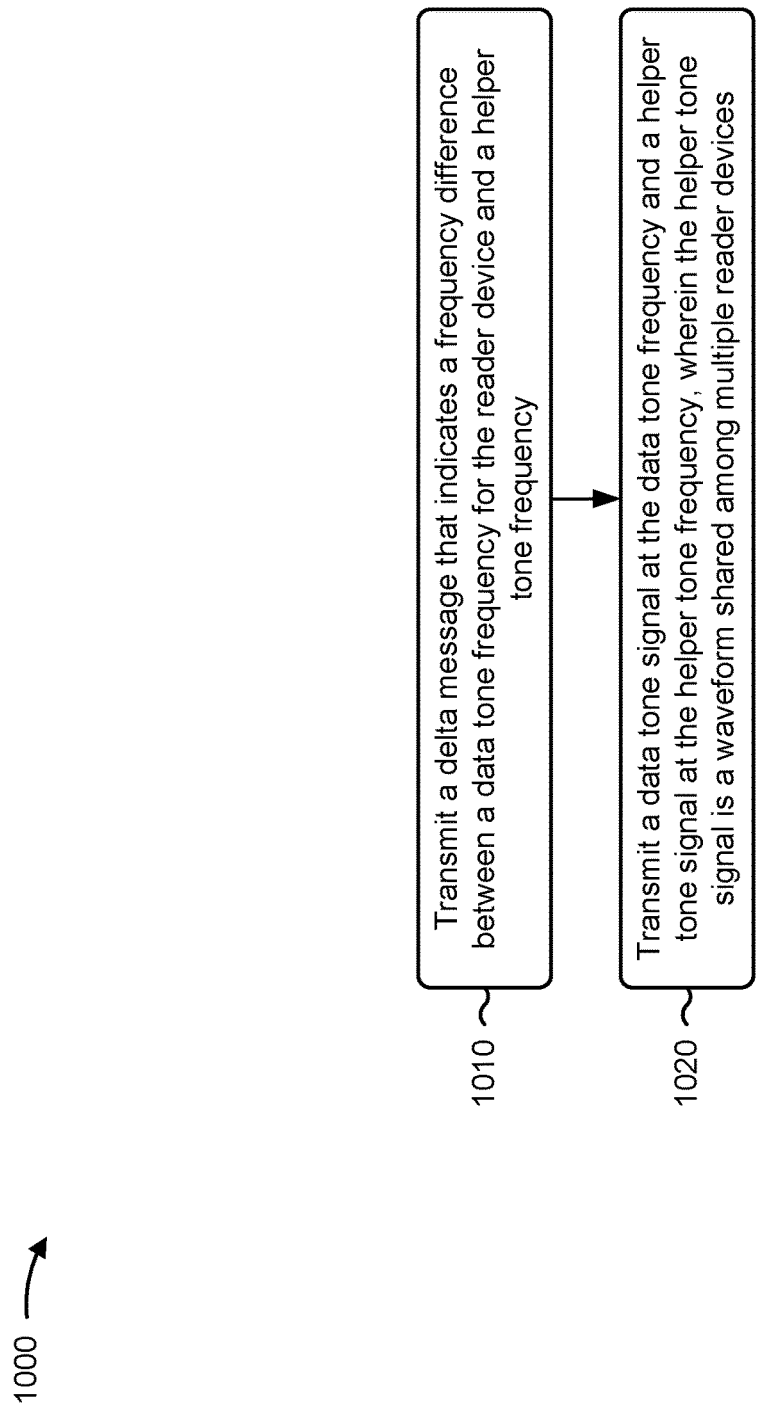
FIG. 10 is a diagram illustrating an example process performed, for example, by a reader device, in accordance with the present disclosure.

FIG. 10 is a diagram illustrating an example process 1000 performed, for example, by a reader device, in accordance with the present disclosure. Example process 1000 is an example where the reader device (e.g., network node 110, UE 120, reader device 910) performs operations associated with indicating a frequency difference for ambient device decoding.

As shown in FIG. 10, in some aspects, process 1000 may include transmitting a delta message that indicates a frequency difference between a data tone frequency for the reader device and a helper tone frequency (block 1010). For example, the reader device (e.g., using transmission component 1204 and/or communication manager 1206, depicted in FIG. 12) may transmit a delta message that indicates a frequency difference between a data tone frequency for the reader device and a helper tone frequency, as described above.

As further shown in FIG. 10, in some aspects, process 1000 may include transmitting a data tone signal at the data tone frequency and a helper tone signal at the helper tone frequency, where the helper tone signal is a waveform shared among multiple reader devices (block 1020). For example, the reader device (e.g., using transmission component 1204 and/or communication manager 1206, depicted in FIG. 12) may transmit a data tone signal at the data tone frequency and a helper tone signal at the helper tone frequency, where the helper tone signal is a waveform shared among multiple reader devices, as described above.

Process 1000 may include additional aspects, such as any single aspect or any combination of aspects described below and/or in connection with one or more other processes described elsewhere herein.

In a first aspect, process 1000 includes selecting the data tone frequency such that the frequency difference does not overlap with a frequency difference between the helper tone frequency and a data tone frequency for a neighboring reader device.

In a second aspect, alone or in combination with the first aspect, process 1000 includes receiving an indication of the data tone frequency for the neighboring reader device.

In a third aspect, alone or in combination with one or more of the first and second aspects, process 1000 includes selecting the data tone frequency such that a frequency difference between the data tone frequency for the reader device and a data tone frequency for a neighboring reader device does not overlap with the frequency difference between the data tone frequency for the reader device and the helper tone frequency and a frequency difference between the data tone frequency for the neighboring reader device and the helper tone frequency.

In a fourth aspect, alone or in combination with one or more of the first through third aspects, process 1000 includes selecting the data tone frequency based at least in part on a distance between the reader device and a neighboring reader device.

In a fifth aspect, alone or in combination with one or more of the first through fourth aspects, process 1000 includes receiving an indication of the distance.

In a sixth aspect, alone or in combination with one or more of the first through fifth aspects, process 1000 includes transmitting an indication of a transmission mode in which an ambient device uses the data tone frequency and the helper tone frequency.

In a seventh aspect, alone or in combination with one or more of the first through sixth aspects, the helper tone signal is a pure sine signal.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
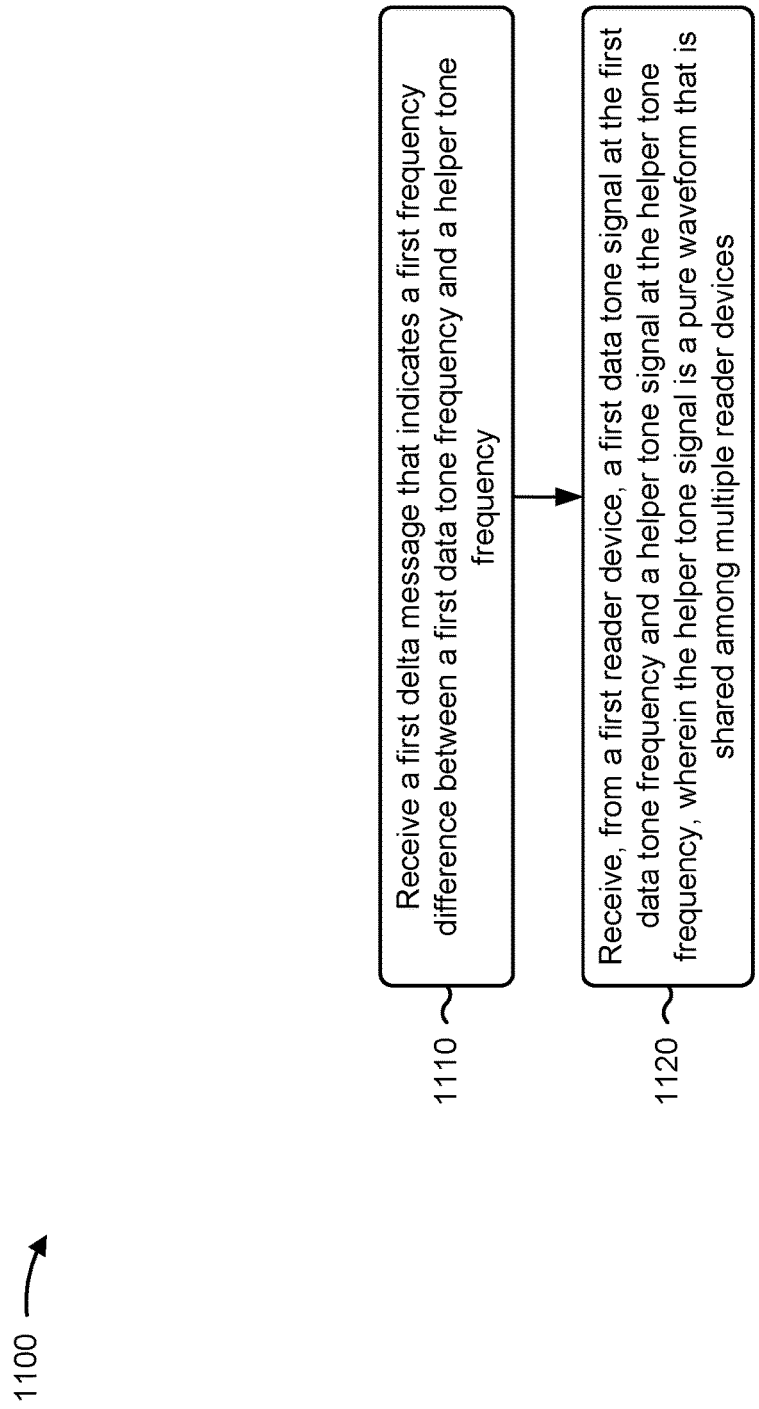
FIG. 11 is a diagram illustrating an example process performed, for example, by an ambient device, in accordance with the present disclosure.

FIG. 11 is a diagram illustrating an example process 1100 performed, for example, by an ambient device, in accordance with the present disclosure. Example process 1100 is an example where the ambient device (e.g., UE 120 or UE 120 with reduced capability, ambient IoT device, tag 920) performs operations associated with using a frequency difference for ambient device decoding.

As shown in FIG. 11, in some aspects, process 1100 may include receiving a first delta message that indicates a first frequency difference between a first data tone frequency and a helper tone frequency (block 1110). For example, the ambient device (e.g., using reception component 1302 and/or communication manager 1306, depicted in FIG. 13) may receive a first delta message that indicates a first frequency difference between a first data tone frequency and a helper tone frequency, as described above.

As further shown in FIG. 11, in some aspects, process 1100 may include receiving, from a first reader device, a first data tone signal at the first data tone frequency and a helper tone signal at the helper tone frequency, where the helper tone signal is a waveform that is shared among multiple reader devices (block 1120). For example, the ambient device (e.g., using reception component 1302 and/or communication manager 1306, depicted in FIG. 13) may receive, from a first reader device, a first data tone signal at the first data tone frequency and a helper tone signal at the helper tone frequency, where the helper tone signal is a waveform that is shared among multiple reader devices, as described above.

Process 1100 may include additional aspects, such as any single aspect or any combination of aspects described below and/or in connection with one or more other processes described elsewhere herein.

In a first aspect, process 1100 includes performing a first envelope detection on the first data tone signal and the helper tone signal, the first envelope detection generating a first component associated with the first frequency difference, and decoding the first data tone signal based at least in part on the first component.

In a second aspect, alone or in combination with the first aspect, process 1100 includes receiving an indication of a transmission mode in which the ambient device uses the first data tone frequency and the helper tone frequency.

In a third aspect, alone or in combination with one or more of the first and second aspects, process 1100 includes receiving a second delta message that indicates a second frequency difference between a second data tone frequency for a second reader device and the helper tone frequency, and receiving, from the second reader device, a second data tone signal at the second data tone frequency and the helper tone frequency at the helper tone frequency.

In a fourth aspect, alone or in combination with one or more of the first through third aspects, process 1100 includes performing a second envelope detection on the second data tone signal and the helper tone signal, the second envelope detection generating a second component associated with the second frequency difference, and decoding the second data tone signal based at least in part on the second component.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
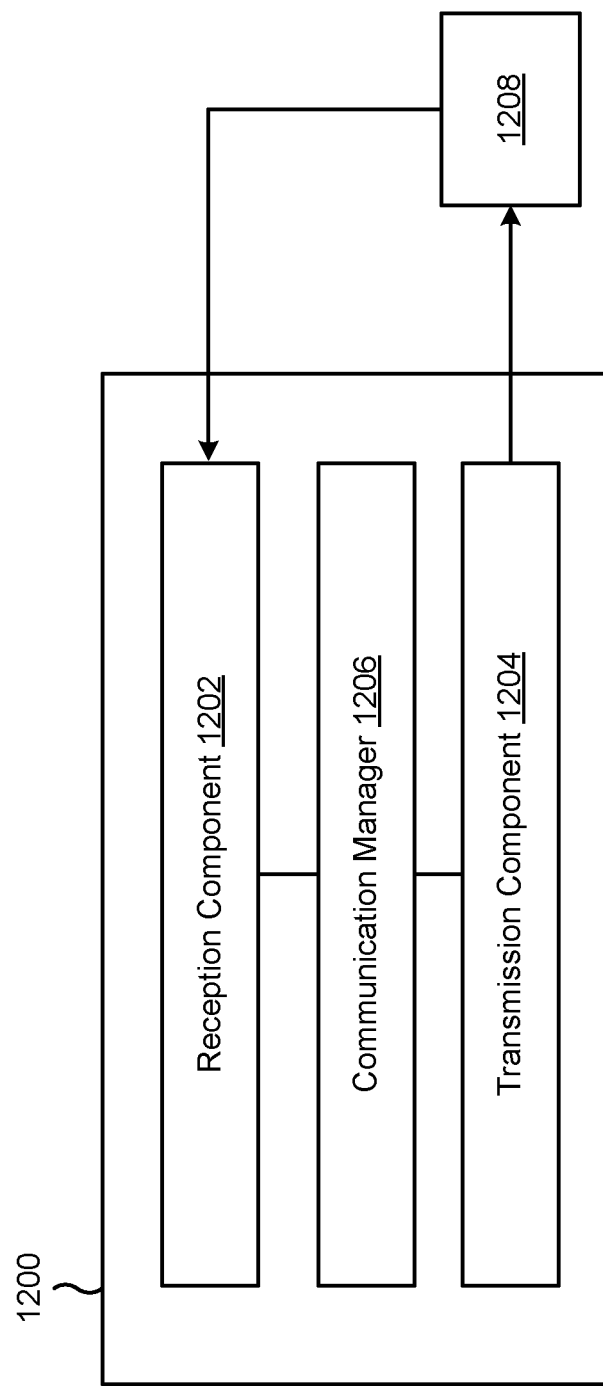
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a reader device (e.g., reader device 910), or a reader device may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 or 150 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 1-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the reader device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the reader device described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the reader device described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit an indication of a transmission mode in which an ambient device uses a data tone frequency and a helper tone frequency. The transmission component 1204 may transmit a delta message that indicates a frequency difference between the data tone frequency for the reader device and the helper tone frequency. The transmission component 1204 may transmit a data tone signal at the data tone frequency and a helper tone signal at the helper tone frequency, where the helper tone signal is a waveform shared among multiple reader devices.

The communication manager 1206 may select the data tone frequency such that the frequency difference does not overlap with a frequency difference between the helper tone frequency and a data tone frequency for a neighboring reader device. The reception component 1202 may receive an indication of the data tone frequency for the neighboring reader device.

The communication manager 1206 may select the data tone frequency based at least in part on a distance between the reader device and a neighboring reader device. The reception component 1202 may receive an indication of the distance.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
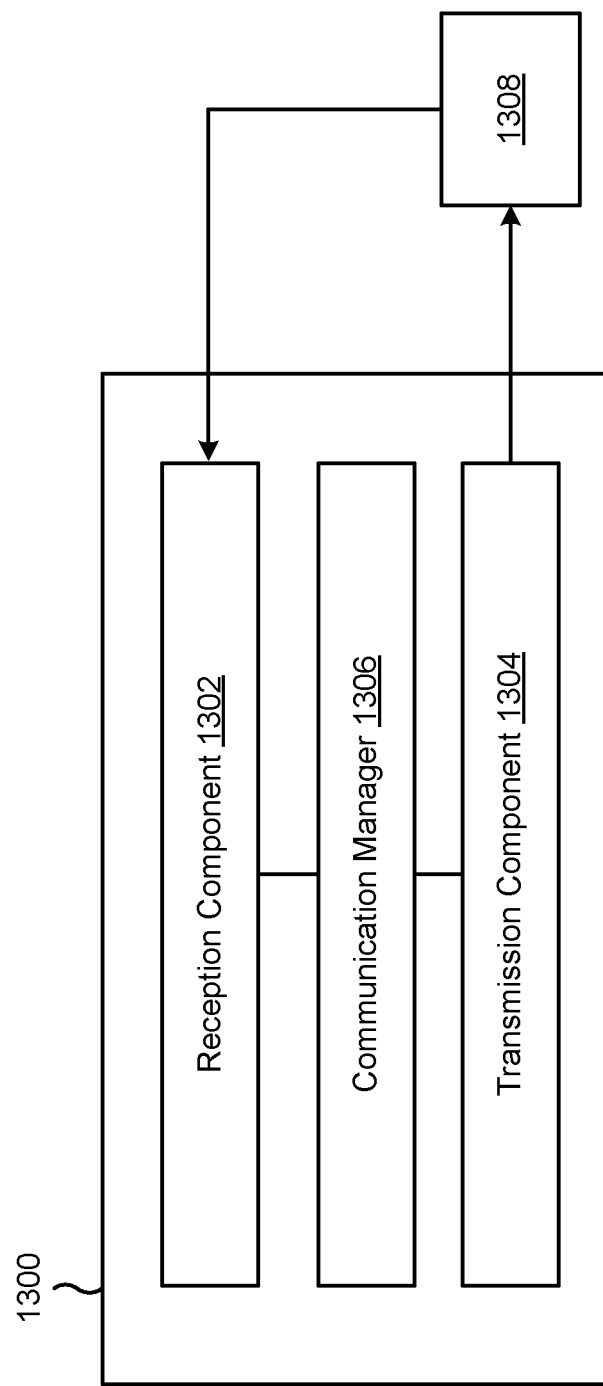
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be an ambient device (e.g., tag 920), or an ambient device may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 140 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 1-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the ambient device described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the ambient device described in connection with FIG. 2.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the ambient device described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive a first delta message that indicates a first frequency difference between a first data tone frequency and a helper tone frequency. The reception component 1302 may receive, from a first reader device, a first data tone signal at the first data tone frequency and a helper tone signal at the helper tone frequency, where the helper tone signal is a waveform that is shared among multiple reader devices.

The communication manager 1306 may perform a first envelope detection on the first data tone signal and the helper tone signal, the first envelope detection generating a first component associated with the first frequency difference. The communication manager 1306 may decode the first data tone signal based at least in part on the first component. The reception component 1302 may receive an indication of a transmission mode in which the ambient device uses the first data tone frequency and the helper tone frequency.

The reception component 1302 may receive a second delta message that indicates a second frequency difference between a second data tone frequency for a second reader device and the helper tone frequency. The reception component 1302 may receive, from the second reader device, a second data tone signal at the second data tone frequency and the helper tone frequency at the helper tone frequency. The communication manager 1306 may perform a second envelope detection on the second data tone signal and the helper tone signal, the second envelope detection generating a second component associated with the second frequency difference. The communication manager 1306 may decode the second data tone signal based at least in part on the second component.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a reader device, comprising: transmitting a delta message that indicates a frequency difference between a data tone frequency for the reader device and a helper tone frequency; and transmitting a data tone signal at the data tone frequency and a helper tone signal at the helper tone frequency, wherein the helper tone signal is a waveform shared among multiple reader devices.

Aspect 2: The method of Aspect 1, further comprising selecting the data tone frequency such that the frequency difference does not overlap with a frequency difference between the helper tone frequency and a data tone frequency for a neighboring reader device.

Aspect 3: The method of Aspect 2, further comprising receiving an indication of the data tone frequency for the neighboring reader device.

Aspect 4: The method of any of Aspects 1-3, further comprising selecting the data tone frequency such that a frequency difference between the data tone frequency for the reader device and a data tone frequency for a neighboring reader device does not overlap with the frequency difference between the data tone frequency for the reader device and the helper tone frequency and a frequency difference between the data tone frequency for the neighboring reader device and the helper tone frequency.

Aspect 5: The method of any of Aspects 1-4, further comprising selecting the data tone frequency based at least in part on a distance between the reader device and a neighboring reader device.

Aspect 6: The method of Aspect 4, further comprising receiving an indication of the distance.

Aspect 7: The method of any of Aspects 1-5, further comprising transmitting an indication of a transmission mode in which an ambient device uses the data tone frequency and the helper tone frequency.

Aspect 8: The method of any of Aspects 1-6, wherein the helper tone signal is a pure sine signal.

Aspect 9: A method of wireless communication performed by an ambient device, comprising: receiving a first delta message that indicates a first frequency difference between a first data tone frequency and a helper tone frequency; and receiving, from a first reader device, a first data tone signal at the first data tone frequency and a helper tone signal at the helper tone frequency, wherein the helper tone signal is a waveform that is shared among multiple reader devices.

Aspect 10: The method of Aspect 9, further comprising: performing a first envelope detection on the first data tone signal and the helper tone signal, the first envelope detection generating a first component associated with the first frequency difference; and decoding the first data tone signal based at least in part on the first component.

Aspect 11: The method of any of Aspects 9-10, further comprising receiving an indication of a transmission mode in which the ambient device uses the first data tone frequency and the helper tone frequency.

Aspect 12: The method of any of Aspects 9-11, further comprising: receiving a second delta message that indicates a second frequency difference between a second data tone frequency for a second reader device and the helper tone frequency; and receiving, from the second reader device, a second data tone signal at the second data tone frequency and the helper tone frequency at the helper tone frequency.

Aspect 13: The method of Aspect 12, further comprising: performing a second envelope detection on the second data tone signal and the helper tone signal, the second envelope detection generating a second component associated with the second frequency difference; and decoding the second data tone signal based at least in part on the second component.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A reader device for wireless communication, comprising:
one or more memories; and
one or more processors, coupled to the one or more memories, configured to:
transmit a delta message that indicates a frequency difference between a data tone frequency for the reader device and a helper tone frequency; and
transmit a data tone signal at the data tone frequency and a helper tone signal at the helper tone frequency, wherein the helper tone signal is a waveform shared among multiple reader devices.

2. The reader device of claim 1, wherein the one or more processors are configured to select the data tone frequency such that the frequency difference does not overlap with a frequency difference between the helper tone frequency and a data tone frequency for a neighboring reader device.

3. The reader device of claim 2, wherein the one or more processors are configured to receive an indication of the data tone frequency for the neighboring reader device.

4. The reader device of claim 1, wherein the one or more processors are configured to select the data tone frequency such that a frequency difference between the data tone frequency for the reader device and a data tone frequency for a neighboring reader device does not overlap with the frequency difference between the data tone frequency for the reader device and the helper tone frequency and a frequency difference between the data tone frequency for the neighboring reader device and the helper tone frequency.

5. The reader device of claim 1, wherein the one or more processors are configured to select the data tone frequency based at least in part on a distance between the reader device and a neighboring reader device.

6. The reader device of claim 5, wherein the one or more processors are configured to receive an indication of the distance.

7. The reader device of claim 1, wherein the one or more processors are configured to transmit an indication of a transmission mode in which an ambient device uses the data tone frequency and the helper tone frequency.

8. The reader device of claim 1, wherein the helper tone signal is a pure sine signal.

9. An ambient device for wireless communication, comprising:
one or more memories; and
one or more processors, coupled to the one or more memories, configured to:
receive a first delta message that indicates a first frequency difference between a first data tone frequency and a helper tone frequency; and
receive, from a first reader device, a first data tone signal at the first data tone frequency and a helper tone signal at the helper tone frequency, wherein the helper tone signal is a waveform that is shared among multiple reader devices.

10. The ambient device of claim 9, wherein the one or more processors are configured to:
perform a first envelope detection on the first data tone signal and the helper tone signal, the first envelope detection generating a first component associated with the first frequency difference; and
decode the first data tone signal based at least in part on the first component.

11. The ambient device of claim 9, wherein the one or more processors are configured to receive an indication of a transmission mode in which the ambient device uses the first data tone frequency and the helper tone frequency.

12. A method of wireless communication performed by a reader device, comprising:
transmitting a delta message that indicates a frequency difference between a data tone frequency for the reader device and a helper tone frequency; and
transmitting a data tone signal at the data tone frequency and a helper tone signal at the helper tone frequency, wherein the helper tone signal is a waveform shared among multiple reader devices.

13. The method of claim 12, further comprising selecting the data tone frequency such that the frequency difference does not overlap with a frequency difference between the helper tone frequency and a data tone frequency for a neighboring reader device.

14. The method of claim 13, further comprising receiving an indication of the data tone frequency for the neighboring reader device.

15. The method of claim 12, further comprising selecting the data tone frequency such that a frequency difference between the data tone frequency for the reader device and a data tone frequency for a neighboring reader device does not overlap with the frequency difference between the data tone frequency for the reader device and the helper tone frequency and a frequency difference between the data tone frequency for the neighboring reader device and the helper tone frequency.

16. The method of claim 12, further comprising selecting the data tone frequency based at least in part on a distance between the reader device and a neighboring reader device.

17. The method of claim 16, further comprising receiving an indication of the distance.

18. The method of claim 12, further comprising transmitting an indication of a transmission mode in which an ambient device uses the data tone frequency and the helper tone frequency.

19. The method of claim 12, wherein the helper tone signal is a pure sine signal.

20. A method of wireless communication performed by an ambient device, comprising:
receiving a first delta message that indicates a first frequency difference between a first data tone frequency and a helper tone frequency; and
receiving, from a first reader device, a first data tone signal at the first data tone frequency and a helper tone signal at the helper tone frequency, wherein the helper tone signal is a waveform that is shared among multiple reader devices.

21. The method of claim 20, further comprising:
performing a first envelope detection on the first data tone signal and the helper tone signal, the first envelope detection generating a first component associated with the first frequency difference; and
decoding the first data tone signal based at least in part on the first component.

22. The method of claim 20, further comprising receiving an indication of a transmission mode in which the ambient device uses the first data tone frequency and the helper tone frequency.

* * * * *